United States Patent Office 3,793,259
Patented Feb. 19, 1974

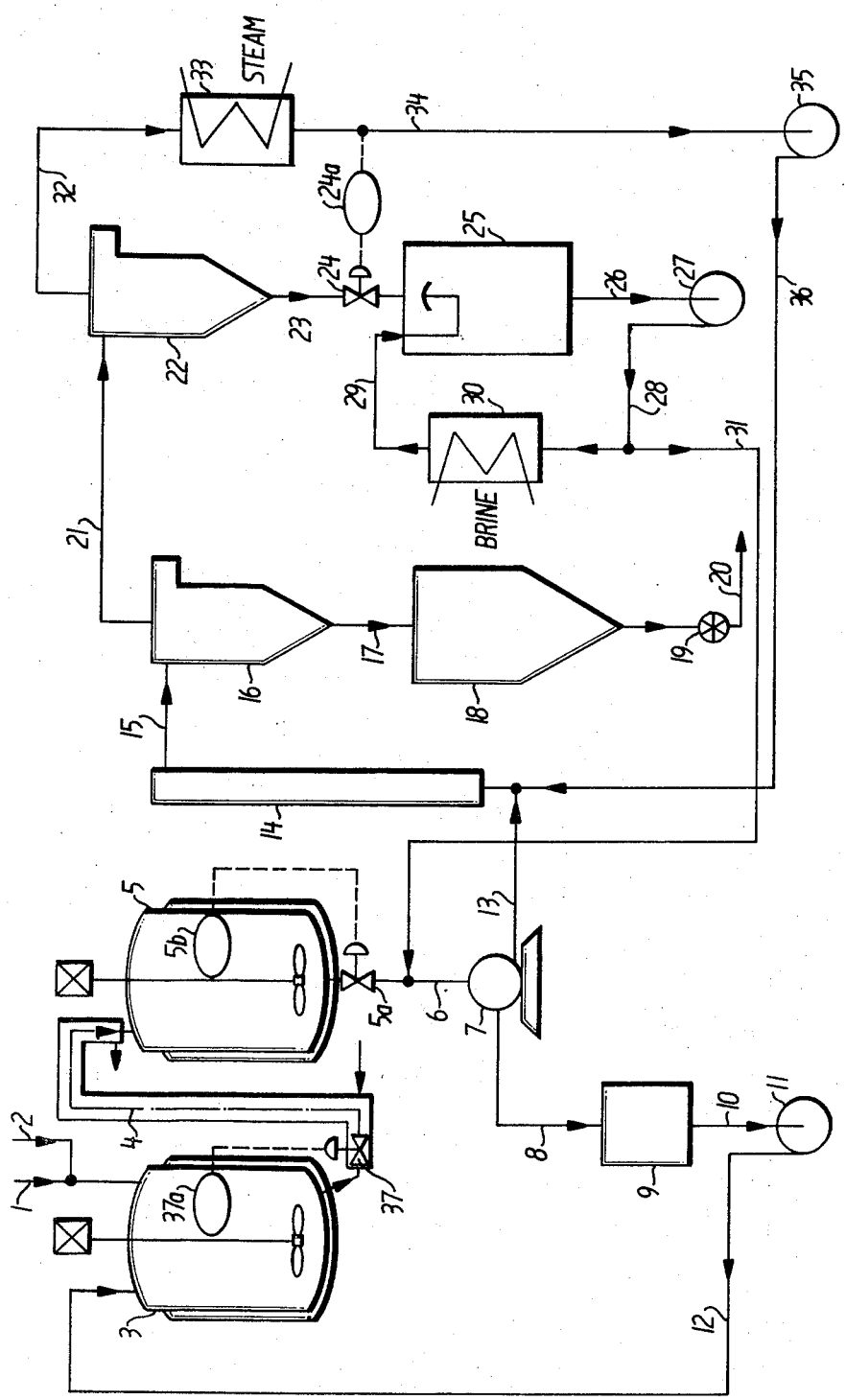

3,793,259
CONTINUOUS BULK POLYMERIZATION OF VINYL CHLORIDE
Horst Brinkmann, Johann Dietrich, Gunter Beckmann, and Jurgen von Guionneau, Marl, Germany, assignors to Chemische Werke Huls Aktiengesellschaft, Marl, Germany
Filed Aug. 18, 1972, Ser. No. 281,654
Claims priority, application Germany, Aug. 20, 1971, P 21 41 770.9
Int. Cl. C08f 1/04, 1/06, 1/98
U.S. Cl. 260—78.5 R
19 Claims

ABSTRACT OF THE DISCLOSURE

A process for the continuous bulk polymerization of vinyl chloride which comprises polymerizing vinyl chloride in a polymerization reactor employing an oil-soluble free radical catalyst at an elevated polymerization temperature while maintaining the temperature of polymerization reactor surfaces contacted by said vinyl chloride and said catalyst below about 0° C. Clogging of polymerization apparatus is thereby eliminated or greatly reduced.

BACKGROUND OF THE INVENTION

Field of the invention

This invention relates to the continuous bulk polymerization of vinyl chloride.

Description of the prior art

The discontinuous method of Pechiney St. Gobain (German published application 1,520,594), has gained great technical importance and acceptance in the bulk polymerization of vinyl chloride.

Although several processes for the continuous bulk polymerization of vinyl chloride have been described in the literature, these processes have not attained commercial acceptance due to the many practical difficulties inherent therein.

Thus, according to German Pat. 975,823, vinyl chloride is continuously polymerized in bulk with express directions to maintain the powder phase in the reactor. The powder phase in the polymerization reactor creates difficulties, especially regarding the removal of the heat of polymerization. Sufficient heat transfer is possible only by intensely mixing the entire content of the vessel. For satisfactory process of the powder phase, a complicated reactor construction must be provided which operates with complex agitating devices expending a considerable amount of mechanical energy. In spite of this, localized hot spots frequently occur in the powder phase which can considerably reduce the quality of the final product, e.g. by the formation of fisheyes.

German published application 1,240,287 relates to a process for the continuous bulk polymerization of vinyl chloride, according to which the polymerization is effected in an agitator-equipped vessel with the usual cooling. The suspension, containing 3–15% by weight of polymer, is discharged by a twin screw (cf. column 3, lines 31 et seq.). In such a process, operating with customary coo'ants at conventional temperatures, cakings are unavoidably encountered after a short time in the form of coatings on the walls of the reaction vessel, on the surfaces of the agitator and on the surfaces of the baffles. These cakings must be removed since they are known to cause inhomogeneities in the product, and furthermore, an increased formation of fisheyes in the polyvinyl chloride, and since they additionally impair heat transfer. These cakings necessitate interruptions in operation and work-consuming cleaning operations.

OBJECTS OF THE INVENTION

Accordingly, it is an object of this invention to provide a process for the continuous bulk polymerization of vinyl chloride in which caking of the polymerization apparatus is eliminated or substantially reduced.

Another object of this invention is to provide a process for the continuous bulk polymerization of vinyl chloride in which the formation of a powder phase during polymerization is eliminated.

A further object of this invention is to greatly reduce reactor downtime in the continuous bulk polymerization of vinyl chloride.

An additional object of this invention is to provide an apparatus suitable for the continuous bulk polymerization of vinyl chloride.

A more particular object of this invention is to provide a circulation drying system suitable for the continuous bulk polymerization of vinyl chloride.

Other objects and advantages of this invention will become apparent to those skilled in the art upon further study of the specification and appended claims.

SUMMARY OF THE INVENTION

Briefly, the above and other objects are attained in one aspect of this invention by providing a process for the bulk polymerization of vinyl chloride which comprises polymerizing vinyl chloride in a polymerization reactor employing an oil-soluble free radical catalyst at an elevated polymerization temperature while maintaining the temperature of polymerization reactor surfaces contacted by said vinyl chloride and said catalyst below about 0° C.

BRIEF DESCRIPTION OF THE DRAWING

The above and other objects will become more fully apparent to those skilled in the art by the following descussion, taken in conjunction with the annexed drawing, which schematically illustrates one apparatus for conducting the process of this invention.

DETAILED DISCUSSION

In the production of polymers or copolymers of vinyl chloride by continuous bulk polymerization according to this invention, in the presence of oil-soluble radical catalysts in an agitator-equipped autoclave preferably having a capacity of at least 50 m.$^3$, the reactor wall, all of the installations within the reactor, and the discharge conduit are maintained, e.g. by means of a cooling medium, at a temperature of at most 0° C., preferably —5° to —10° C. The polymerization is conducted to a conversion of between 5 and 20% by weight preferably 10–15% by weight, and the thus-provided suspension is cooled in a subsequent cooling stage to a temperature below the polymerization temperature prior to being worked up.

For effecting the polymerization, all oil-soluble free radical activators can be utilized which, at 30° C., exhibit a half-life value of greater that about 50 hours. Suitable catalyst compounds include but are not limited to acetylcyclohexylsulfonyl peroxide, tert.-butyl peroxypivalate, and dialkylperoxydicarbonates, e.g., dicetyl peroxydicarbonate, as well as other conventional oil-soluble radical catalysts, e.g., lauroyl peroxide, benzoyl peroxide, or azobisisobutyronitrile, wherein mixtures of catalysts of shorter and longer half-lives can be advantageously employed.

The catalysts are utilized in catalytic amounts, generally 0.2–0.7% by weight, preferably 0.2–0.4% by weight, based on the monomer.

Suitable comonomers which can be polymerized with vinyl chloride include but are not limited to vinyl acetate, vinylidene chloride, acrylic acid esters, methacrylic acid esters, maleic acid, etc. Up to 30% by weight, based on the entire monomer mixture, of comonomer can be employed.

The reaction is conducted in the elevated temperature ranges customary for the polymerization of vinyl chloride, e.g. 40 to 70° C., and generally at saturation pressure. The particular temperature used will depend upon the K-value desired in the final product.

The polymerization reactor surfaces contacted by the bulk polymerization mixture of vinyl chloride and catalyst are generally maintained at a temperature of 40–90° C., preferably 40–80° C. below the polymerization temperature. Excessive cooling of these surfaces is wasteful and can lead to a lowering of the polymerization temperature; insufficient cooling minimizes the benefits obtained by cooling.

Preferably, a temperature differential is maintained between the reactor surfaces and the temperature at which the catalyst or catalyst mixture being used has a half life of about 50 hours or more of at least 30–40° C. and not more than 40–50° C., preferably 35–40° C.

The temperature of the reactor surfaces will usually be 12–32° C., preferably 17–22° C. below the temperature at which thermal inhibition of the free radical catalyzed polymerization occurs. By thermal inhibition is meant a lowering of temperature of radical catalyzed polymerization mixture down to a state at which practically no more polymerization occurs.

While not wishing to be bound by any theory of the invention, it is believed that cooling reactor surfaces this amount establishes a zone of thermal inhibition along the reactor surfaces which aids in eliminating or greatly reducing caking thereof.

The reaction vessel, the impeller agitator, and the reflux condenser are of customary construction, e.g. manufactured by the Pfaudler Co., a Division of Ritter Pfaudler Corp. Rochester, N.Y. 14603. The two oppositely disposed baffles have an approximately rectangular base and are mounted to the vessel wall so that their angles of incidence are adjustable. The stirring velocity is preferably 2–5 m./sec.

In the cooling vessel, the thus-obtained polymer suspension is cooled with cooling water at about 0–10° C. to a temperature of 5–15° C. and thus thermally inhibited. The working-up process can then be continued by squeezing out the liquid monomer in the twin screw and subsequently removing residual monomer in a drum dryer (cf. German published application 1,240,287, column 4).

A particularly advantageous manner of working up the reaction product utilizes a pressurized separating machine and a circulation dryer operating with superheated monomer at about 20° C., as described hereinbelow, and shown in the figure.

Referring now to the drawing, the polymerization stage comprises a jacketed polymerization reactor 3, into which are continuously fed monomer and activator solutions via conduits 1 and 2 respectively. The cooling stage includes a jacketed pipe conduit 4 leading from reactor 3 through pneumatic control valve 37 to a cooling vessel 5. A liquid level sensor 37a controls valve 37 in response to the changes of liquid monomer level in the reactor 3.

Polymerization is conducted in reactor 3, e.g., at 70° C. and 12.7 atm. absolute, and the resultant suspension, e.g. with a 15% solids content, is expanded via bottom valve 37 and passed through conduit 4 into a jacketed cooling vessel 5 where polymerization is thermally inhibited at 10° C. and 2.5 atm. abs. The suspension is charged through control valve 5a via conduit 6, under the same pressure as in the cooling vessel 5, into pressurized separating device 7. A liquid level sensor 5b controls valve 5a in a response to the changes of the suspension level in the cooling vessel 5. The essentially powdery polymer-free liquid phase filtrate passes via pipe conduit 8 into intermediate surge tank 9 and is then recycled to polymerization reactor 3 via conduit 10, pump 11, and conduit 12.

The still moist powdery polymer-containing phase recovered from separating device 7 is passed via conduit 13 into a circulation dryer cycle downstream of circulation dryer 14, which is operated with superheated, but preferably cold monomer, e.g. at about 20–30° C. The superheated monomer is preferably added in an amount approximating the monomer content of the powdery polymer-containing phase, and dries the polymer by evaporating liquid monomer present in this phase. The circulation dryer cycle comprises conduit 15 leading from dryer 14 to a preliminary separator 16; conduit 21 leading from the upper portion of separator 16 to a post separator 22; conduit 32 leading from the upper end of separator 22b to a heat exchanger 33, from which conduit 34, through blower 35 and conduit 36, return fluids to the circulation dryer 14. The dry polymer powder is mainly separated from the monomer in the preliminary separator 16 and is then subjected, depending on the desired residual monomer content, to a vacuum post-drying step in the drying vessel 18, connected to separator 16 by solids discharge conduit 17, and is then discharged through discharge valve 19 into solids discharge conduit 20. Heat is fed to the monomer circulated in the circulation dryer cycle at heat exchanger 33 in an amount corresponding to the amount of heat removed therefrom during evaporation in the dryer 14. Heated, or preferably superheated, monomer is recycled via lines 34 and 36 to circulator dryer 14. Excess monomer is withdrawn from the cycle, with residual amounts of dust, at the bottom of post separator 22 via conduit 23, passed through pneumatic pressure control valve 24, and fed through injection cooler 25. The pressure sensor 24a controls valve 24 in response to the changes of pressure in conduit 34. The amount of cold necessary for condensation is fed to the monomer via a cooling cycle comprising a conduit 26 leading from the downstream end of the injection cooler through pump 27 to conduit 28 thence to heat exchanger 30, and recycled into the injection cooler 25 via conduit 29. Excess condensed monomer is withdrawn from the cycle downstream of the heat exchanger via conduit 31 and recycled to the liquid monomer cycle, e.g. upstream of separating device 7 into conduit 6, and ultimately to the polymerization reactor.

In a preferred mode of operation, approximately equal amounts of evaporated gaseous monomer are condensed at cooler 25 and heated at heat exchanger 33, respectively.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE

A vertical polymerization reactor having a capacity of 100 m.$^3$ was used with a reflux condenser having a cooling surface of 170 m.$^2$. The agitator, baffles, and double jacket of the polymerization reactor had brine heat exchange media flowing therethrough. The reactor was agitated at 31.5 r.p.m., by a bottom drive impeller agitator having a diameter of 3 m. 80 m.$^3$ of liquid vinyl chloride, corresponding to 72.8 tons, and 55.0 kg. of acetylcyclohexanesulfonyl peroxide, as a 28.0 wt. percent solution in dimethyl phthalate, were charged into the cold reactor by means of suitable metering devices.

The amount of free radical catalyst was selected for the starting reaction so that a 15% conversion of the initially introduced vinyl chloride was attained in about 1.5 hours at an internal reactor temperature of 55° C.

After charging, the reactor contents were heated to 55° C. via the brine cycle. Once the reactor contents had reached this polymerization temperature, necessary for a K-value of 68, the brine cycle was rapidly cooled to −5° C.

Taking the agitating energy into account, assumed to be 100% together with the heat of polymerization, about 48% of the heat was dissipated through the reactor wall, about 26% through the reflux condenser, and about 23% was required for heating up the monomer freshly charged into the reactor, while the remainder represented a loss of about 3%.

A continuous study of heat conditions yielded information regarding the course of the reaction within the vessel, so that continuous feeding of the catalyst could be started even prior to reaching the desired conversion of 15%. As soon as 15% conversion was attained, the metered feeding of fresh vinyl chloride was begun. At the same time, a corresponding amount of polymer suspension was introduced via conduit 4 into the cooling vessel 5. The metered amounts were increased until 49.0 tons/hour of polymer suspension with a 15% solids content was removed from the reactor. Thus, the continuously operating reactor 3 was charged with about 49.0 tons/hour of monomeric vinyl chloride and 36.5 kg./hour of acetylcyclohexanesulfonyl peroxide as a 28.0 wt. percent solution in dimethyl phthalate.

In the cooling vessel 5, the suspension temperature was lowered by 43° C. to 12° C. This agitated cooling vessel 5 was identical in construction and equipment with the polymerization reactor 3; the coolant was cold water at a temperature of +5° C., rather than brine.

From the cooling vessel, the suspension was fed to two parallel-operating pressurized decanting centrifuge separating devices 7. The polymer powder discharged from the separators had a residual moisture content of 29% by weight vinyl chloride. The moist powder was dried in the circulation dryer 14 with super-heated vinyl chloride gas at 30° C., discharged from the circulation dryer cycle via line 15 through the cyclone separator 16 at which point it had a residual moisture content of about 3% by weight, and passed via line 17 to be subjected, in drying vessel 18, to a post drying process to reduce residual moisture to below 0.5% by weight. Approximately 7.3 tons/hour of polyvinyl chloride was discharged through line 20 from the vacuum post drying stage via the discharge valve 19.

From the injection cooler 25, about 2.7 tons/hour of vinyl chloride via conduit 31 and, as a filtrate, about 38.7 tons/hour of vinyl chloride from separating device 7 via conduit 8 could be recycled into the polymerization reactor 3. About 0.3 ton/hour of vinyl chloride gas was removed from the vacuum drying arrangement as a loss. Thus, 7.6 tons/hour of fresh monomer was introduced into the reactor.

The plant was operated for several weeks without the formation of coatings on reactor walls or in pipes which interferred with heat transfer or caused clogging. The reaction product was practically free of fisheyes.

COMPARATIVE EXAMPLE

A pressurized polymerization reactor having a capacity of 8 m.³ was equipped with a three-fingered baffle and an impeller agitator driven from the bottom and operating at 60 r.p.m. The reactor was equipped with a double jacket completely encompassing the reactor, and with a reflux condenser having heat exchange surface area of 16 m.².

6,000 kg./hour of vinyl chloride and 4.5 kg./hour of acetylcyclohexanesulfonyl peroxide, as a 28.0 wt. percent solution in dimethyl phthalate, were charged into the reactor. The reactor yielded a polymerization product of 900 kg./hour of polyvinyl chloride at 55° C., which was continuously discharged as a 15% suspension in monomer.

The water cycle for the twin jackets of the polymerization reactor was maintained at 30° C. Temperature and/or pressure controls of the reactor were effected via the reflux condenser which was fed directly with cooling water at 15° C. In the cooling vessel, the suspension temperature was lowered from the polymerization temperature to 20° C. in order to thermally inhibit the polymerization.

The suspension was worked up as previously described via a pressurized decanting centrifuge, a circulation dryer, and a subsequent post drying stage in a vacuum vessel. An increased number of fisheyes was observed after only the first day of this continuous mode of operation with a wall temperature of the polymerization reactor of about 30° C. After operating for two days, the number of fisheyes which formed was so large that the process had to be interrupted, and additionally the reactor had to be freed of coatings which had formed on the wall, the agitator and the baffles.

The preceding eamples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A single stage process for the continuous bulk polymerization of vinyl chloride which comprises:
   (a) polymerizing vinyl chloride in a polymerization reactor employing an oil-soluble free radical catalyst at an elevated polymerization temperature while maintaining the temperature of polymerization reactor surfaces contacted by said vinyl chloride and said catalyst below about 0° C.;
   (b) discharging a polymer suspension at a conversion of 5–20% by weight, based on the starting monomer content; and
   (c) cooling the discharged polymer suspension to thermally inhibit polymerization outside the reactor.

2. A process according to claim 1, further comprising separating solid vinyl chloride polymer from said cooled suspension.

3. A process according to claim 1 wherein said polymerization reactor is an agitator-equipped autoclave in which the temperature of reactor wall, agitator and discharge outlet surfaces contacted by said vinyl chloride and said catalyst is maintained by an internally circulating liquid coolant.

4. A process according to claim 1 wherein said reactor surfaces are maintained at a temperature of −5 to −10° C.

5. A process according to claim 1 wherein said polymerization temperature is about 40–70° C. and wherein said free radical catalyst has a half-life of at least 50 hours at 30° C. as determined in dimethylphthalate.

6. A process according to claim 1 wherein vinyl chloride is copolymerized with up to 30% by weight of a comonomer selected from the group consisting of vinyl acetate, vinylidene chloride, acrylic acid esters, methacrylic acid esters and maleic acid.

7. A process according to claim 2 wherein said cooled suspension is separated at a pressure of 0.5–15 atmospheres gauge into a powdery polymer-containing phase and an essentially powdery polymer-free liquid phase.

8. A process according to claim 7 further comprising recycling said liquid phase to the polymerization reactor.

9. A process according to claim 7 further comprising drying the powdery polymer-containing phase by contacting said phase with superheated gaseous monomer to evaporate liquid monomer present in said phase.

10. A process according to claim 9 wherein said superheated gaseous monomer is at a temperature of about 20–30° C.

11. A process according to claim 9 wherein the superheated gaseous monomer is used in an amount approximately equal to the amount of liquid monomer present in said powdery polymer-containing phase.

12. A process according to claim 9 further comprising condensing a portion of the resultant evaporated gaseous monomer and recycling condensed monomer to the polymerization reactor.

13. A process according to claim 9 further comprising heating a portion of the resultant evaporated gaseous monomer and recycling heated monomer to dry said powdery polymer-containing phase.

14. A process according to claim 12 further comprising heating a portion of the resultant evaporated gaseous monomer and recycling heated monomer to dry said powdery polymer-containing phase.

15. A process according to claim 14 wherein approximately equal amounts of evaporated gaseous monomer are condensed and heated respectively.

16. A process according to claim 4 wherein said autoclave has a capacity of at least 50 m.$^3$.

17. A process according to claim 1 wherein the polymer suspension is discharged at a conversion of 10–15 wt. percent.

18. A process according to claim 4 wherein said reactor surfaces are maintained 40–90° C. below the polymerization temperature.

19. A process according to claim 18 wherein said temperature is 12–32° C. below the temperature at which thermal inhibition of the free radical catalyzed polymerization occurs.

References Cited

UNITED STATES PATENTS

| | | | |
|---|---|---|---|
| 3,544,280 | 12/1970 | Thomas | 23—290 |
| 3,562,237 | 2/1971 | Thomas | 260—92.8 |
| 3,625,932 | 12/1971 | Green | 260—92.8 |

JOSEPH L. SCHOFER, Primary Examiner

J. KIGHT III, Assistant Examiner

U.S. Cl. X.R.

23—288 K; 260—78.5 CLH, 86.3, 87.1, 87.5, 87.7, 92.8 R, 95 C